United States Patent
Fuller

(10) Patent No.: US 9,038,368 B2
(45) Date of Patent: May 26, 2015

(54) SYSTEMS, METHODS, AND APPARATUS FOR PROVIDING A MULTI-FUEL HYBRID ROCKET MOTOR

(75) Inventor: Jerome K. Fuller, Van Nuys, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 952 days.

(21) Appl. No.: 13/195,629

(22) Filed: Aug. 1, 2011

(65) Prior Publication Data

US 2013/0031888 A1 Feb. 7, 2013

(51) Int. Cl.
F02K 9/12 (2006.01)
F02K 9/10 (2006.01)
F02K 9/36 (2006.01)
F02K 9/16 (2006.01)
F02K 9/34 (2006.01)

(52) U.S. Cl.
CPC ... *F02K 9/12* (2013.01); *F02K 9/10* (2013.01); *F02K 9/16* (2013.01); *F02K 9/343* (2013.01)

(58) Field of Classification Search
CPC ............... F02K 9/08; F02K 9/10; F02K 9/12; F02K 9/14; F02K 9/16; F02K 9/18; F02K 9/20; F02K 9/22; F02K 9/24; F02K 9/26; F02K 9/28; F02K 9/32; F02K 9/343; F02K 9/346; F02K 9/36
USPC ................................... 60/250, 253, 255, 254
See application file for complete search history.

(56) References Cited

U.S. PATENT DOCUMENTS 2,877,504 A 3/1959 Fox
3,136,831 A 6/1964 Zinn
3,142,152 A 7/1964 Sessums, Jr.
3,144,830 A 8/1964 De Fries et al.
3,166,898 A 1/1965 Hoeptner
3,177,657 A 4/1965 Strauss et al.
3,196,735 A 7/1965 Baldwin (Continued)

FOREIGN PATENT DOCUMENTS

DE 2024897 B1 12/1971
DE 102005039906 3/2007

(Continued)

OTHER PUBLICATIONS

Search Report for International Application No. PCT/US2012/049218 mailed Oct. 30, 2012.

(Continued)

*Primary Examiner* — Andrew Nguyen
(74) *Attorney, Agent, or Firm* — Sutherland Asbill & Brennan LLP

(57) ABSTRACT

Certain embodiments of the invention may include systems, methods, and apparatus for providing a multi-fuel hybrid rocket motor. According to an example embodiment of the invention, a method is provided for producing a multi-fuel hybrid motor. The method can include forming a body, where the body includes one or more intake ports; one or more exit nozzles; one or more channels connecting the one or more intake ports with the one or more exit nozzles; and a plurality of cavities comprising segment walls in communication with the one or more channels. The method also includes depositing a propellant fuel within the plurality of cavities, wherein at least a portion of the propellant fuel is exposed to the one or more channels and wherein the propellant fuel has a higher burn consumption rate than the segment walls.

20 Claims, 8 Drawing Sheets

(56) References Cited

U.S. PATENT DOCUMENTS

| | | | |
|---|---|---|---|
| 3,201,936 A | 8/1965 | Victor | |
| 3,242,668 A | 3/1966 | Ellis | |
| 3,256,819 A | 6/1966 | Leeper | |
| 3,283,510 A * | 11/1966 | Mangum et al. | 60/250 |
| 3,423,943 A | 1/1969 | Stark | |
| 3,449,600 A | 6/1969 | Holzman | |
| 3,468,125 A * | 9/1969 | Cramer, Jr. | 60/39.47 |
| 3,494,286 A | 2/1970 | Taylor | |
| 3,646,597 A | 2/1972 | Feemster | |
| 3,664,133 A | 5/1972 | Iwanciow et al. | |
| 3,677,010 A | 7/1972 | Fink et al. | |
| 3,715,888 A | 2/1973 | Massie | |
| 3,744,427 A * | 7/1973 | Good et al. | 102/285 |
| 3,789,610 A | 2/1974 | Stone | |
| 3,844,118 A | 10/1974 | Wilkinson | |
| 3,919,841 A * | 11/1975 | Panella | 60/255 |
| 3,995,559 A | 12/1976 | Bice et al. | |
| 4,015,427 A | 4/1977 | Brooks | |
| 4,148,187 A | 4/1979 | Younkin | |
| 4,314,509 A | 2/1982 | Dalet | |
| 4,406,863 A | 9/1983 | Jenkins | |
| 4,458,607 A | 7/1984 | Schoeber et al. | |
| 4,483,139 A | 11/1984 | Engl | |
| 4,510,874 A | 4/1985 | Hasenack | |
| 4,730,601 A | 3/1988 | Hubele et al. | |
| 5,119,627 A | 6/1992 | Bradford et al. | |
| 5,339,625 A | 8/1994 | McKinney et al. | |
| 5,367,872 A | 11/1994 | Lund | |
| 5,386,777 A | 2/1995 | Lou et al. | |
| 5,529,648 A | 6/1996 | Stickler | |
| 5,619,011 A | 4/1997 | Dean | |
| 5,619,073 A | 4/1997 | Posey et al. | |
| 5,623,115 A | 4/1997 | Lauritzen et al. | |
| 5,714,711 A | 2/1998 | Schumacher et al. | |
| 5,715,675 A | 2/1998 | Smith et al. | |
| 5,765,361 A | 6/1998 | Jones et al. | |
| 5,794,435 A | 8/1998 | Jones | |
| 6,014,857 A | 1/2000 | Stinnesbeck | |
| 6,082,097 A * | 7/2000 | Smith et al. | 60/251 |
| 6,092,366 A | 7/2000 | Smith et al. | |
| 6,125,763 A * | 10/2000 | Kline et al. | 102/381 |
| 6,148,610 A | 11/2000 | Calabro et al. | |
| 6,165,307 A | 12/2000 | Fair et al. | |
| 6,311,479 B1 | 11/2001 | Lo | |
| 6,796,171 B2 | 9/2004 | Heisler et al. | |
| 6,865,878 B2 | 3/2005 | Knuth et al. | |
| 6,880,326 B2 | 4/2005 | Karabeyoglu et al. | |
| 7,022,196 B2 | 4/2006 | Cesaroni et al. | |
| 7,955,453 B1 | 6/2011 | Kelley et al. | |
| 8,225,507 B2 | 7/2012 | Fuller | |
| 8,601,790 B2 | 12/2013 | Fuller | |
| 2002/0028854 A1 | 3/2002 | Allanic et al. | |
| 2002/0036038 A1 | 3/2002 | Karabeyoglu et al. | |
| 2002/0062756 A1 | 5/2002 | Archer | |
| 2003/0004599 A1 | 1/2003 | Herbak | |
| 2004/0068976 A1 | 4/2004 | Knuth et al. | |
| 2005/0120703 A1 | 6/2005 | Rohrbaugh et al. | |
| 2006/0005729 A1 | 1/2006 | Milton et al. | |
| 2009/0217525 A1 | 9/2009 | Fuller | |
| 2009/0217642 A1 * | 9/2009 | Fuller | 60/251 |
| 2010/0281850 A1 | 11/2010 | Fuller | |
| 2010/0307131 A1 | 12/2010 | Danforth et al. | |
| 2012/0285016 A1 | 11/2012 | Fuller | |
| 2013/0042596 A1 | 2/2013 | Fuller | |
| 2013/0042951 A1 | 2/2013 | Fuller | |

FOREIGN PATENT DOCUMENTS

| | | | | |
|---|---|---|---|---|
| EP | 0426363 A2 | | 5/1991 | |
| FR | 1315914 A | | 1/1963 | |
| GB | 885409 | * | 2/1959 | F02K 9/16 |
| WO | 96/12610 A2 | | 5/1996 | |
| WO | 00/05133 A2 | | 2/2000 | |
| WO | 03/089218 A1 | | 10/2003 | |
| WO | 2009/145947 | | 12/2009 | |

OTHER PUBLICATIONS

Written Opinion for International Application No. PCT/US2012/049218 mailed Oct. 30, 2012.

Search Report for International Application No. PCT/US2012/049153 mailed Oct. 17, 2012.

Written Opinion for International Application No. PCT/US2012/049153 mailed Oct. 17, 2012.

International Search Report dated Sep. 23, 2009 for International Application No. PCT/US09/35545.

Written Opinion of the International Searching Authority dated Sep. 23, 2009 for International Application No. PCT/US09/35545.

Pham, D.T., Gault, R.S., "A Comparison of Rapid Prototyping Technologies", International Journal of Machine Tools & Manufacture, vol. 38, No. 10-11, 1998, pp. 1257-1287.

Hinkley, D., "A Novel Cold Gas Propulsion System for Nanosatellites and Picosatellites," AIAA/USU Conference on Small Satellites, AIAA, Utah State University, Utah, 2008.

Altman, D., and Holzman, A., "Overview and History of Hybrid Rocket Propulsion," Fundamentals of Hybrid Rocket Combustion and Propulsion, edited by M. J. Chiaverini and K. K. Kuo, Progress in Astronautics and Aeronautics, AIAA, Reston, Virginia, 2007, pp. 1-33.

Boardman, T. A., "Hybrid Propellant Rockets," Rocket Propulsion Elements, edited by G. P. Sutton and O. Biblarz, Wiley-Interscience, New York, 2001, pp. 579-608.

Altman, D., and Humble, R., "Hybrid Rocket Propulsion Systems," Space Propulsion Analysis and Design, edited by R. W. Humble, G. N. Henry, and W. J. Larson, Space Technology Series, McGraw-Hill Companies, Inc, New York, 1995, pp. 365-443.

Karabeyoglu, M. A., Zilliac, G., Cantwell, B.J., DeZilwa, S., and Castelluci, P. "Scale-Up Tests of High Regression Rate Paraffin-Based Hybrid Rocket Fuels" Journal of Propulsion and Power, vol. 20, No. 6, 2004, pp. 1037-1045.

Search Report and Written Opinion for International Application No. PCT/US2012/049153 mailed Oct. 17, 2012.

Search Report and Written Opinion for International Application No. PCT/US2012/049218 mailed Oct. 30, 2012.

Dornhaim, M.A., "Ideal Hybrid Fuel is ... Wax?", Aviation Week and Space Technology, McGraw-Hill Company, New York, NY, vol. 158, No. 5, Feb. 3, 2003, pp. 52-54.

Search Report and Written Opinion for International Application No. PCT/US2012/049185 mailed Feb. 27, 2013.

* cited by examiner

SYSTEMS, METHODS, AND APPARATUS FOR PROVIDING A MULTI-FUEL HYBRID ROCKET MOTOR

FIELD OF THE INVENTION

This invention generally relates to hybrid rocket motors, and more particularly to systems, methods, and apparatus for providing a multi-fuel hybrid rocket motor.

BACKGROUND OF THE INVENTION

Hybrid rocket motors or "hybrid motors" have recently been given greater attention in the space community. Hybrid motors use reactants of different physical phase states, usually a solid fuel such as rubber and a liquid or gaseous oxidizer, such as nitrous oxide. Hybrid motors do not generally deliver the performance of liquid motors. However, hybrid motors are safer and simpler to build and to operate. Hybrid motors can have good performance but often have problems maintaining the proper oxidizer-to-fuel or "O/F" ratio over the duration of the burn. Hybrid motors also tend to be physically long along the rocket motor axis for the same reasons. Hybrid motors can have complicated systems for introducing the gaseous oxidizer portion at different positions lengthwise in the fuel section.

Hybrid solid fuel bodies are generally two-dimensional shapes extruded into the third dimension. A simple example is a thick-walled tube extruded along the length of the tube. Such a tube is characterized as having a center axial flow channel, usually called a "port." The oxidizer is injected through an intake opening and into the solid fuel body and out through a nozzle as exhaust. The fuel is ignited by an igniter positioned proximal to where the oxidizer first contacts the fuel near the intake. The solid fuel bodies generally have a center elongated flow channel through which the oxidizer flows after ignition for ablating the fuel on the side walls of the center elongated flow channel. The fuel is burned on the internal surface effectively ablating, or "regressing," the solid fuel interior wall. As the fuel is burned, and port diameter increases, the combustion becomes oxidizer rich. If oxidizer-rich burning occurs, additional oxidizer must be carried, and the efficiency of the system is typically poor. Complex fuel grain shapes are sometimes used to increase the amount of surface area in the elongated center flow channel, but sometimes at the risk of an unsupported section of fuel breaking off and plugging the nozzle, causing a catastrophic failure of the hybrid motor. As the fuel burns through the elongated center flow channel, the oxidizer burns the inside of the channel. The growing diameter of the elongated center flow channel changes the ratio between the oxidizer flowing in the channel and the exposed burning fuel on the side walls of the elongated center flow channel. The hybrid rocket motor suffers from changing the oxidizer-to-fuel ratio. The oxidizer-to-fuel ratio becomes oxidizer rich and thereby wastes available oxidizer that could otherwise be used for burning more of the fuel.

Another problem associated with hybrid motors at least for use in launch vehicles, is low regression rates, typically one-third of that of composite solid propellants. Regression rate is the depth-wise rate at which the fuel is removed from the surface where burning occurs. This is a factor in the development of rocket engine thrust. A great amount of research has gone into replacing the solid rocket boosters on the Space Shuttle with hybrid motors only to show that hybrids suffer from low regression rates, which may make replacing large solid motors very difficult.

A problem associated with the fabrication of hybrid motors where paraffin wax is the fuel, is approximately 15% shrinkage as the liquid paraffin wax cools to a solid. Fuel grains, which are cast, can develop voids or bubbles. One method of alleviating this problem is to spin or otherwise rotate the fuel grain in a lathe-like apparatus so that the fuel is forced against the motor casing and a port naturally forms along the motor axis. This technique can limit the minimum port diameter and lends itself to a relatively simple round-shaped port, which is usually not compatible with the use of additives, particularly those with different densities than paraffin wax. Additives of a higher density than paraffin wax would be flung toward the motor casing rather than being evenly distributed throughout the fuel grain.

BRIEF SUMMARY OF THE INVENTION

Some or all of the above needs may be addressed by certain embodiments of the invention. Certain embodiments of the invention may include systems, methods, and apparatus for providing a multi-fuel hybrid rocket motor.

According to an example embodiment of the invention, a method is provided for producing a multi-fuel hybrid motor. The method can include forming a body, where the body includes one or more intake ports; one or more exit nozzles; one or more channels connecting the one or more intake ports with the one or more exit nozzles; and a plurality of cavities comprising segment walls in communication with the one or more channels. The method also includes depositing a propellant fuel within the plurality of cavities, wherein at least a portion of the propellant fuel is exposed to the one or more channels and wherein the propellant fuel has a higher burn consumption rate than the segment walls.

According to another example embodiment, a rocket is provided. The rocket includes a multi-fuel hybrid motor that includes a body. The body includes one or more intake ports and one or more exit nozzles. The motor further includes one or more channels connecting the one or more intake ports with the one or more exit nozzles; a plurality of cavities including segment walls in communication with the one or more channels; and a propellant fuel disposed (or deposited) within the plurality of cavities, wherein at least a portion of the propellant fuel is exposed to the one or more channels and wherein the propellant fuel has a higher burn consumption rate than the segment walls.

According to another example embodiment, a multi-fuel hybrid motor is provided. The motor includes a body that includes one or more intake ports and one or more exit nozzles. The motor further includes one or more channels connecting the one or more intake ports with the one or more exit nozzles; a plurality of cavities comprising segment walls in communication with the one or more channels; and a propellant fuel disposed within the plurality of cavities, wherein at least a portion of the propellant fuel is exposed to the one or more channels and wherein the propellant fuel has a higher burn consumption rate than the segment walls.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying figures, which are not necessarily drawn to scale, and wherein.

DETAILED DESCRIPTION OF THE INVENTION

Figure 1:
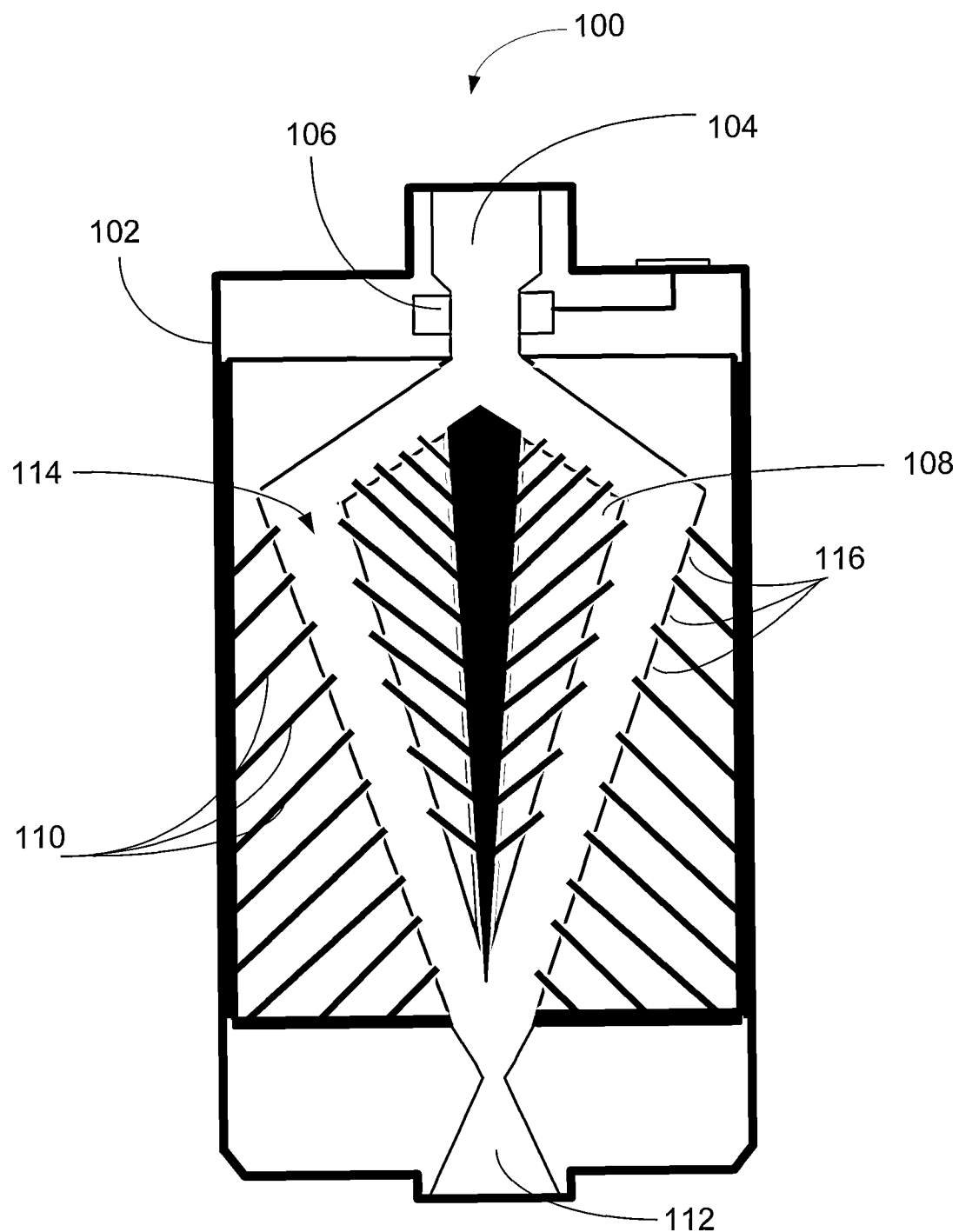
FIG. 1 is a diagram of an illustrative multi-fuel hybrid rocket motor according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used herein, the term "body" can refer to a relatively solid fuel body for a rocket motor and is sometimes referred to as a "fuel grain." As used herein, the term "port" can refer to a generally open space within a fuel body for a rocket motor and can be associated or in communication with an input or output of the motor. As used herein, the term "channel" can refer to a generally open bore through the solid fuel body and can be associated with propellant mixing and combustion. As used herein, the term "cavity" can refer to a full or partial enclosure within the fuel body. In example embodiments, a cavity will have at least one opening for interaction with a channel or an adjacent cavity. In other example embodiments, certain cavities may be enclosed for an initial part of a burn cycle, but may subsequently develop an opening as the burn progresses. As used herein, the term "segment walls" can refer to elements associated with forming cavities. As used herein, the term "propellant fuel" can refer to a fuel, an additive, an inhibitor, a mixture of fuel and another compatible substance, or any substance that can be mixed with any of the foregoing. As used herein, the term "solid fuel" can refer to a fuel, an additive, an inhibitor, a mixture of fuel and another compatible substance, or any substance that can be mixed with any of the foregoing, but with a generally higher melting or deflagration temperature than the propellant fuel. In an example embodiment, the segment walls can be made from a solid fuel.

Certain embodiments of the invention generally provide for systems, methods, and apparatus for providing a multi-fuel hybrid rocket motor. Certain embodiments of systems and methods described herein can provide multi-fuel hybrid rocket motors used for satellite propulsion and other small motors. According to an example embodiment, the hybrid rocket motor may use a fuel and an oxidizer, which are in two different physical phase states, for example, a solid fuel and a liquid oxidizer. According to an example embodiment, paraffin wax and other fuels may be utilized as a high regression rate fuel. Regression rate is the linear rate at which the fuel surface is burned away, stated as distance vs. time (inches/second), and is an indicator of thrust. Acrylic plastic and other materials may be utilized as a low regression rate fuel, and may be utilized to provide structural support, cavities, channels, and other elements associated with the motor. In an example embodiment, the motor casing of a hybrid rocket can be built to withstand high pressures, and it may serve as the combustion chamber as well as propellant container.

Certain example embodiments of the invention may utilize a combination of high regression rate fuel with low regression rate fuel, where the low regression rate fuel may be used as a feature or structure to enhance burning by causing turbulence, and may be utilized to liberate the surface area of the high regression rate fuel. Because a variety of different shapes can be made using various systems, methods, and apparatus according to embodiments of the invention, relatively complex multi-fuel hybrid rocket motors can be formed for relatively larger hybrid or composite rocket motors. Lower costs, increased sizes, and freedom of choice to use different fuel materials can result in using certain embodiments of the systems and methods described herein.

Example embodiments of the invention include a hybrid rocket fuel grain that may contain both a consumable structural fuel and a high regression rate fuel. Laboratory prototypes have been fabricated and tested on grain cells of wax contained within an acrylic structure. As the wax cells burn, large surface areas of acrylic are exposed. According to an aspect of the invention, by tailoring the size and shape of each cell (or cavity) and the thickness of its surrounding acrylic walls (or segment walls), motors can be designed with high regression rate materials dominating the early portion of the burn. In example embodiments, low regression rate materials (including materials with a high energy density) may burn at a slower rate compared to the high regression rate materials. According to an example embodiment, diameters associated with ports and channels may widen as the fuel and/or structural materials are burned. According to certain example embodiments, segment walls associated with cells (or cavities) may be consumed during the burn process to expose additional propellant fuel for burning and/or interaction with the oxidizer. According to another aspect of the invention, the size, shape, placement, orientation of each cell (or cavity) and/or the exposure sequence of the cells to channels or to each other may be tailored to produce motors with enhanced interaction among oxidizer and fuels.

Rapid Prototyping (RP), often called Additive Manufacturing (AM), is a family of technologies used to generate three-dimensional shapes by computer control. Several diverse technologies fall under this broad term. In the RP process, thin two-dimensional layers of material are laid down, one on top of the other to form arbitrary three-dimensional shapes. A wide range of materials from plastics to foodstuffs can be literally printed in three dimensions.

The benefits of RP techniques include the elimination of expensive tooling, decreased design cycle-time and the decoupling of design complexity from fabrication cost. Additionally, RP offers some advantages that are more subtle and more profound for the specific applications of hybrid and composite solid rocket motor fabrication. According to example embodiments of the invention, RP processes may be employed to produce rocket motor fuel grains. These grains, free from the constraints of physical tooling, may incorporate shapes and features that increase mixing and surface area or help balance the oxidizer-to-fuel ratio over the course of a burn.

According to example embodiments of the invention, RP may be utilized to produce structural, plumbing, ignition, propellant management and even diagnostic features that can be "written" into the fuel grain design and then fabricated as a monolithic part. The complete three-dimensional shape control afforded by RP techniques may allow specific port design features that would be difficult or impossible to fabricate with traditional methods. Example embodiments of the invention include using RP to make helical ports, blind or submerged ports, radial ports, and ports with undercuts or undulating surface features.

In an example embodiment, RP techniques may be utilized to print all or part of a hybrid motor. Certain techniques, according to example embodiments of the invention may involve rapid prototyping, casting, spinning, or a combination thereof. For example, certain structural features may be made using RP, casting in molds, or a combination thereof. For example, structural features, including cells and segment walls may be made with one or more of thermoplastic, thermoset plastic, acrylic, aluminum, polybutadiene acrylic acid acrylonitrile (PBAN), hydroxy-terminator polybutadiene (HTPB), paper, cloth, phenolic, aramid fibers (Kevlar, Nomex), polyethylene, polypropylene, ABS plastic, PVC, polycarbonate, polystyrene, acetyl, epoxy, rubber, nylon, carbon fiber cloth, or metal.

According to example embodiments, propellant fuel may be selectively deposited within the structural features (cells, cavities, etc.) by RP. In another example embodiment, the propellant fuel may be deposited using spinning techniques. For example, motor bodies with pre-defined structural regions (such as cavities, segment walls, channels, and ports) may be spun on a lathe-like apparatus after molten wax (or other propellant material) is poured into the body. The material may fill up the cavities via centrifugal force and may solidify when cooled.

According to example embodiments, the propellant fuel can include, but is not limited to, animal wax, vegetable wax, mineral wax, petroleum wax, synthetic wax, rubber, acrylic, PVC, kerosene, alcohol, vegetable oil, petroleum oil, liquid methane, solid methane, liquid hydrogen, or liquefied natural gas.

According to example embodiments of the invention, scaffolding and other structural elements can be fabricated using any of a variety of techniques. Passages left in the scaffolding can be coated or filled with a second material. In example embodiments, either the scaffolding or the filling material can be the high regression rate material.

In an example embodiment, a pre-combustion chamber (or vaporization chamber) can be placed between the inlet and the fuel grain to allow for vaporization of liquid oxidizer and to provide even distribution into multiple input ports. According to example embodiments of the invention, a post-combustion chamber may be included between the fuel grain and the nozzle to allow a more complete reaction of oxidizer gas and any residual or un-burned fuel. Example embodiments may include both a pre-combustion and a post-combustion chamber.

In certain example embodiments, a motor may be created having a liquid fuel contained in the cells or cavities. In one example embodiment, the liquid fuel may be wax at an elevated temperature. According to an example embodiment, heating elements can be incorporated into the structure for heating the wax. According to certain example embodiments, heating elements can be consumed with the fuel. In certain example embodiment, the heaters may be disposed external to the cells or body. In certain example embodiments, the heaters may be disposed within the cells, cavities, and/or segment walls. According to an example embodiment, one or more expansion chambers may be included to accommodate heated and expanding fuel material. According to an example embodiments, the burn rate for paraffin-based motors may be enhanced with liquid paraffin, for example, since it could be designed to spray out of a ruptured cell and into the port or channel, thereby interacting quickly with the oxidizer.

Various parts, materials, and methods for providing the multi-fuel hybrid rocket motor, according to example embodiments of the invention, will now be described with reference to the accompanying figures.

FIG. 1 illustrates an example multi-fuel hybrid rocket motor 100 according to an example embodiment of the invention. The example motor 100 may include a body 102, which according to example embodiments, may provide encasing and structural support for the components and features within. The motor may include one or more intake ports 104. In an example embodiment, the intake ports 104 may be utilized for receiving oxidizer material or other fuel additives. In an example embodiment, an igniter 106 may be utilized to ignite oxidizer and/or fuel. In example embodiments, cavities 116 (or cells) may be formed within the motor 100. In an example embodiment, the cavities 116 may include segment walls 110. According to example embodiments, propellant fuel 108 may be disposed within the cavities 116. As previously described, the propellant fuel 108 may be a relatively high regression rate material. In example embodiments, the segment walls 110 may include a relatively low regression rate material in comparison to the propellant fuel 108. According to example embodiments of the invention, the cavities 116 and propellant fuel 108 may be exposed to one or more channels 114, which may be in communication with the one or more intake ports 104. According to example embodiments, the channels 114 may be in communication with one or more exit nozzles 112.

Figure 2:
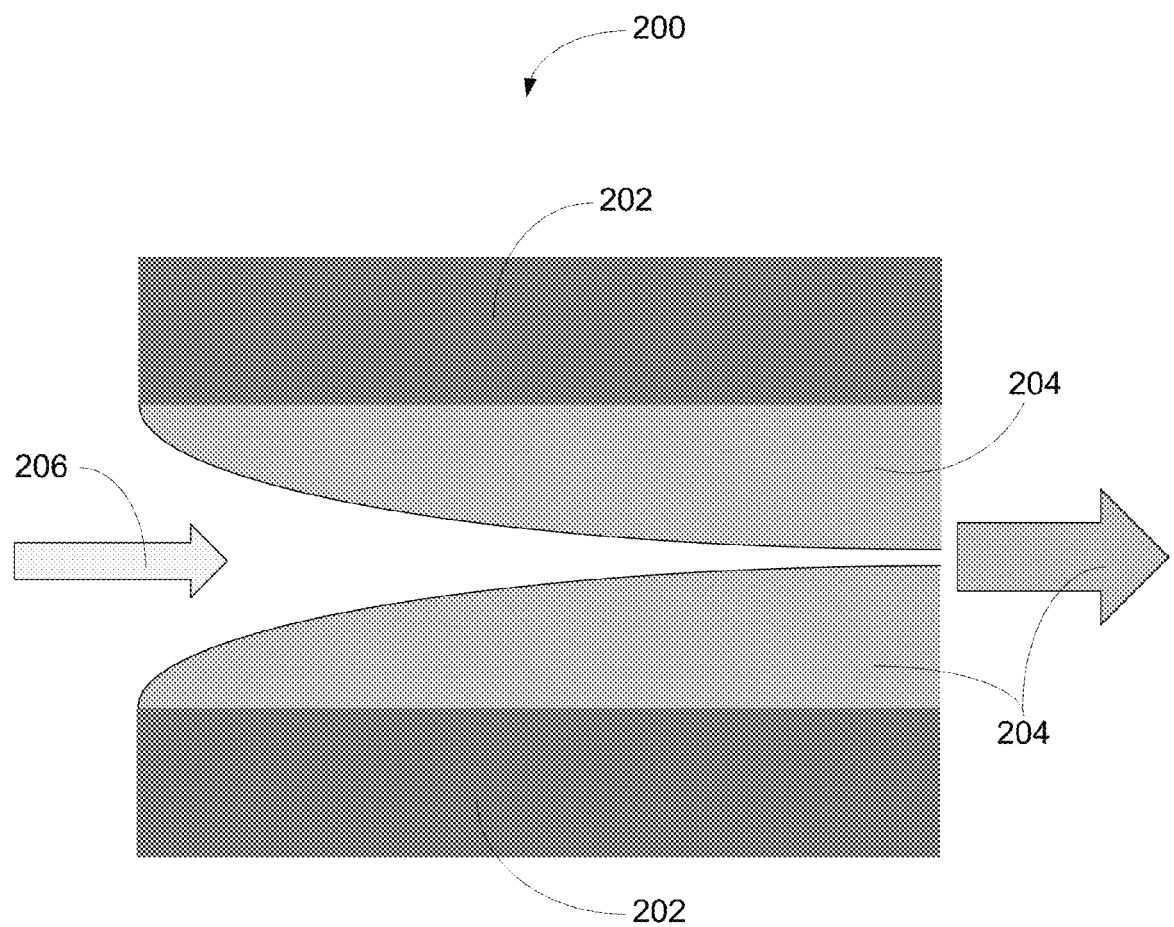
FIG. 2 is a diagram of a typical hybrid rocket motor.

FIG. 2 depicts a typical hybrid motor 200 (without cells or cavities). Oxidizer 206 may interact with fuel 202 to produce a flame 204. In this example, the interaction between the oxidizer and the fuel may be limited since there is limited mixing.

Figure 3:
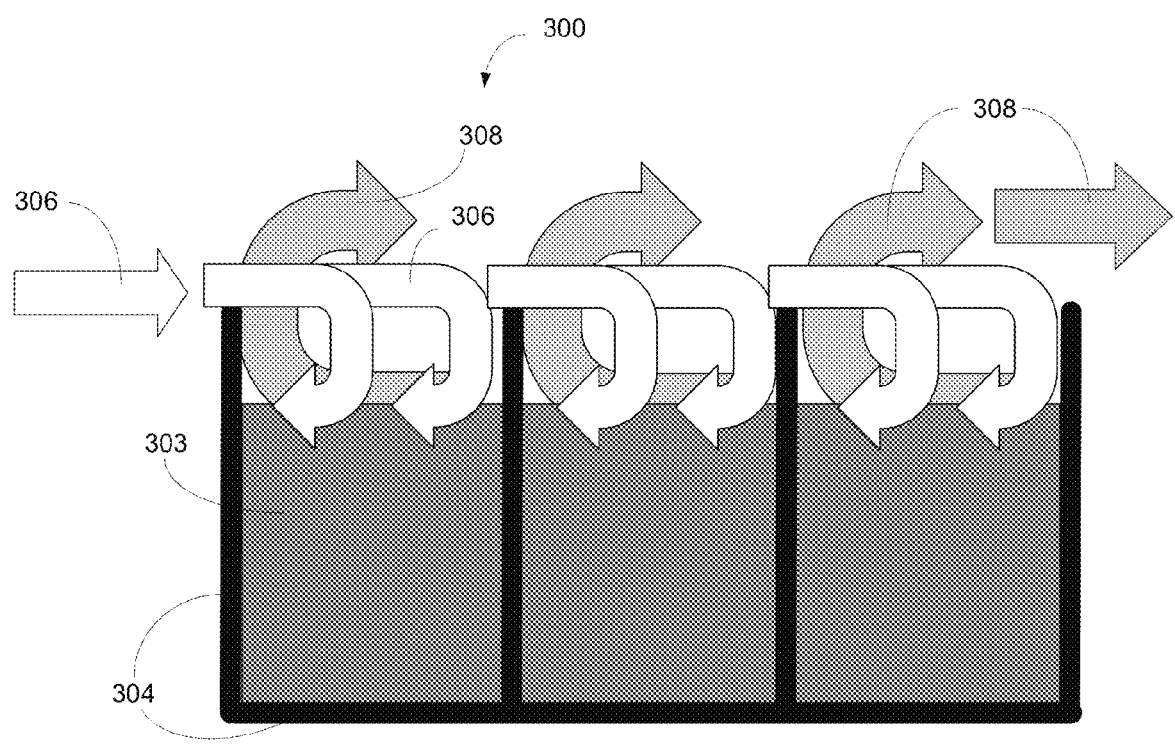
FIG. 3 is a diagram of oxidizer swirl within the plurality of cavities containing propellant fuel according to an example embodiment of the invention.

In comparison, FIG. 3 depicts a diagram of a motor section 300, according to an example embodiment of the invention. In the example embodiment, oxidizer 306 may swirl and interact with cavities 304 containing propellant fuel 303 to produce a flame 308 and thrust. In this example embodiment, the surface area of the propellant fuel 303 may increase for increased exposure and interaction with the oxidizer 306 as the propellant fuel 303 is consumed.

Figure 4:
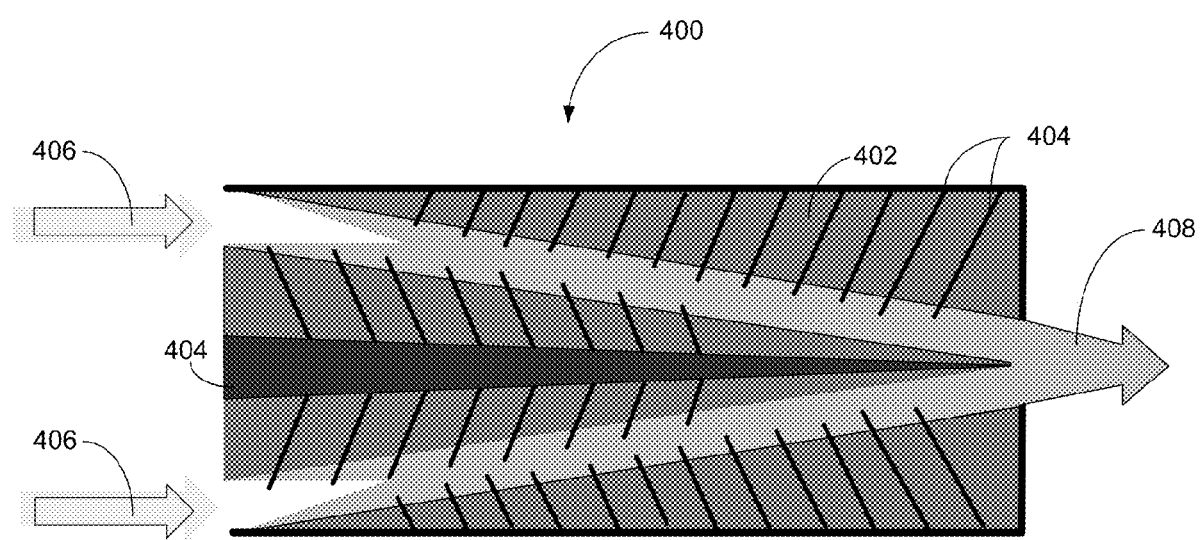
FIG. 4 is a block diagram of an illustrative multi-fuel hybrid rocket motor according to an example embodiment of the invention.

FIG. 4 depicts another illustrative multi-fuel hybrid rocket motor 400 according to an example embodiment of the invention. In this example embodiment, propellant fuel 402 may be disposed within cavities defined by segment walls 404. In an example embodiment, oxidizer 406 may swirl and interact with the propellant fuel 402 in the cavities to produce a flame 408.

Figure 5:
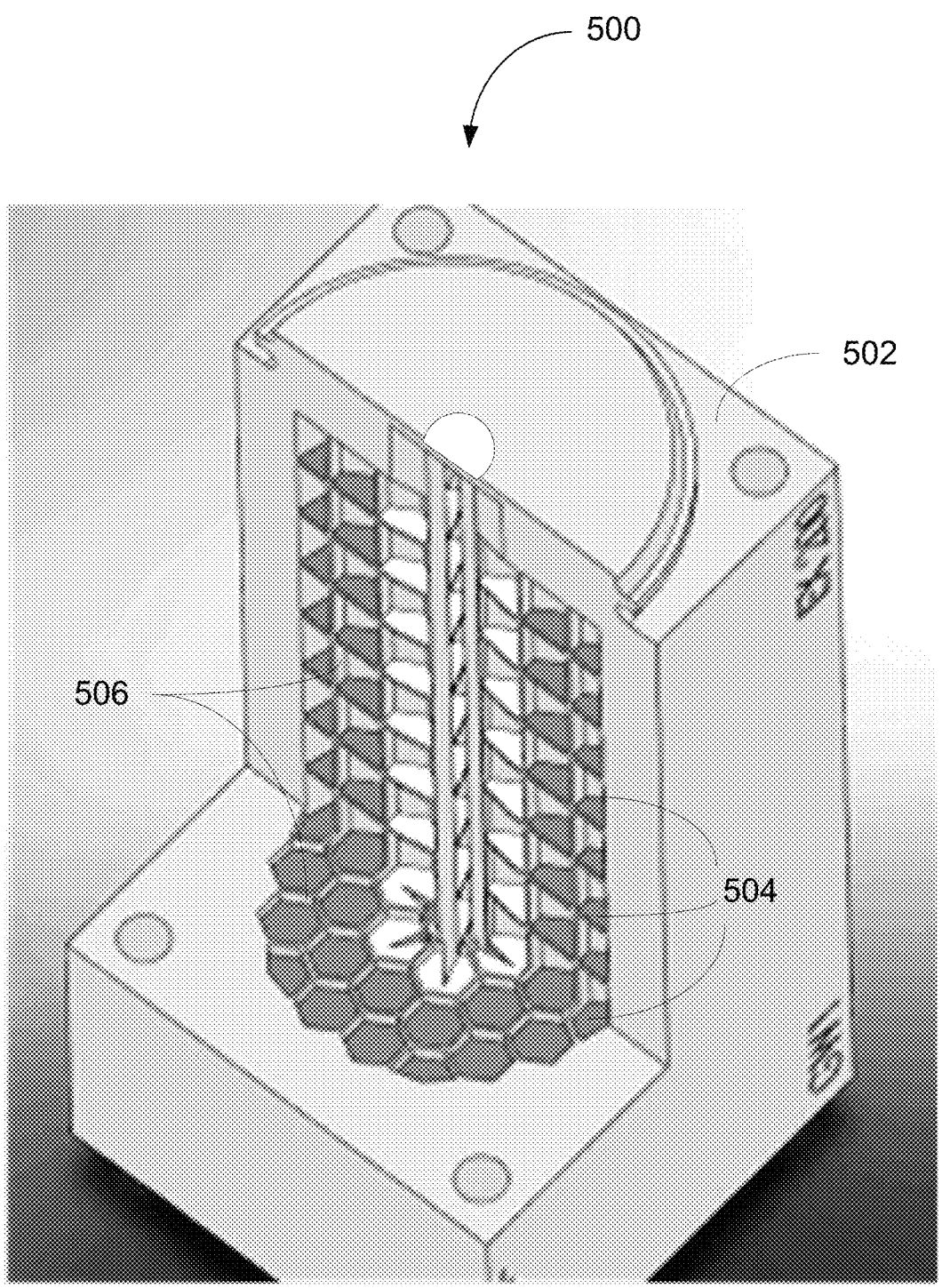
FIG. 5 is a plan view diagram of an illustrative multi-fuel hybrid rocket motor according to an example embodiment of the invention.

FIG. 5 is a plan view diagram of an illustrative multi-fuel hybrid rocket motor 500 according to an example embodiment of the invention. The motor 500 may have cells or cavities 504 defined by segment walls 506. According to example embodiments, cavities 504 associated with the motor 500 may be arranged in a manner that may provide certain thrust characteristics over the ignition and burn period. For example, blind ports may be defined in the structure to connect certain cavities 504 with channels so that, during the burn cycle, certain segment walls 506 may be consumed to open up access to the blind ports and provide additional pathways for oxidizer interaction with the propellant fuel. FIG. 5 depicts a central port or channel having a star shape, but numerous other shapes may be made within the scope of the invention.

Figure 6:
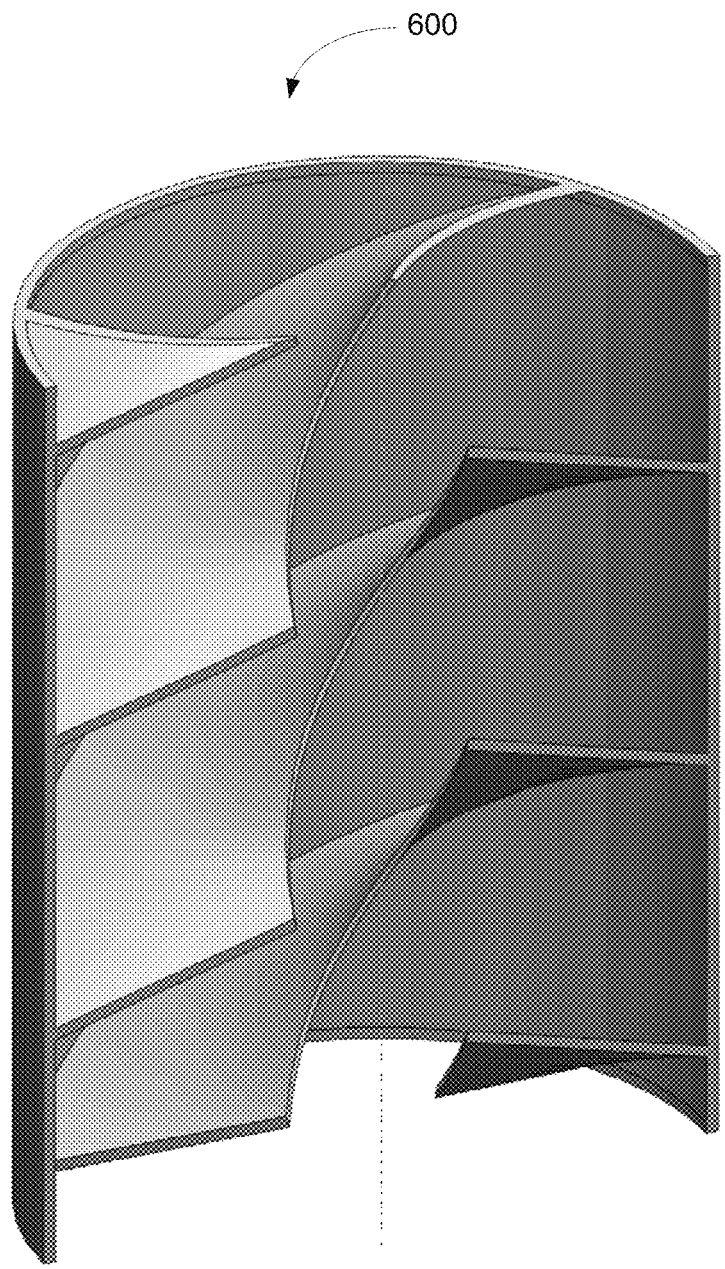
FIG. 6 is a half-section plan view of a turbulator for use in a hybrid rocket motor according to an example embodiment of the invention.

FIG. 6 depicts a half-section plan view of a turbulator 600 for use in a hybrid rocket motor according to an example embodiment of the invention. The turbulator 600, as its name suggests, may enhance turbulence within a hybrid motor by causing a spiral flow. Example embodiments of the invention may include inserting turbulator 600 into the motor body. Other example embodiments may include using rapid prototyping to build the turbulator 600 structure. Example embodiments may include forming the turbulator 600 using traditional fabrication methods.

Figure 7:
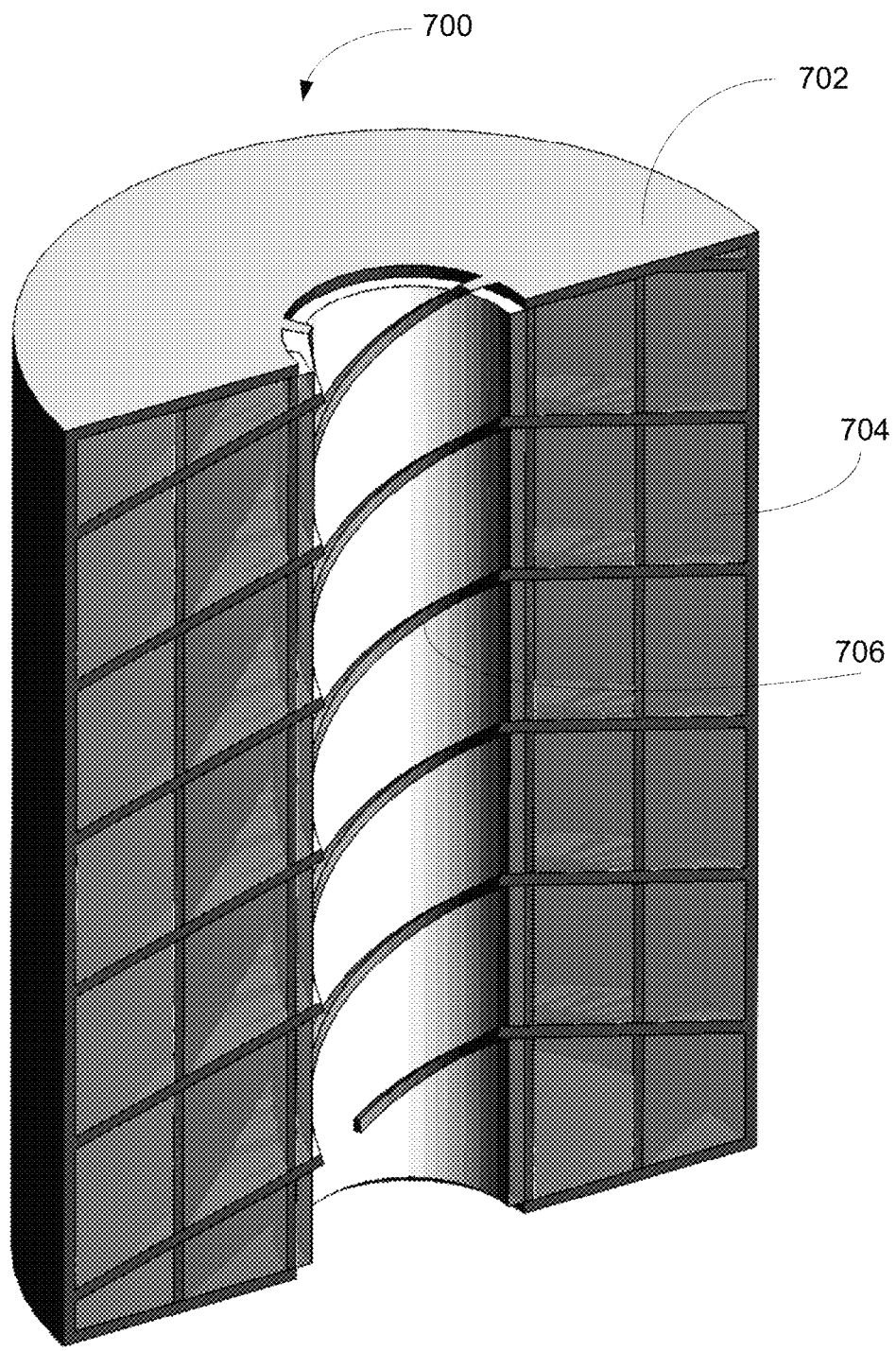
FIG. 7 is a half-section plan view of an assembly for use in a hybrid rocket motor according to an example embodiment of the invention.

FIG. 7 depicts a half-section plan view of an assembly 700 for use in a hybrid rocket motor according to an example embodiment of the invention. According to example embodiments, the assembly 700 may include a turbulator (as in 600 of FIG. 6). For example, portions fins associated with the turbulator 706 are shown in FIG. 7. According to example embodiments of the invention, the assembly may include a body 702, which may be made from acrylic or other low regression rate materials described herein. Embodiments of the assembly may have propellant fuel 704 disposed within cells or cavities (as in 504 of FIG. 5). According to example embodiments of the invention, the assembly 700 may be made of consumable material that has a different melting or deflagration temperature than the surrounding propellant fuel 704. For example, while the motor is burning, the turbulator 706 may burn more slowly and, therefore, project into the flow of oxidizer and cause turbulence as it is eroded away. In an example embodiment, the turbulator 706 element can be placed in a mold or motor liner before the fuel is poured into the mold or casing. In example embodiments, the outer wall of the turbulator 706 may also serve as a casing or liner.

Figure 8:
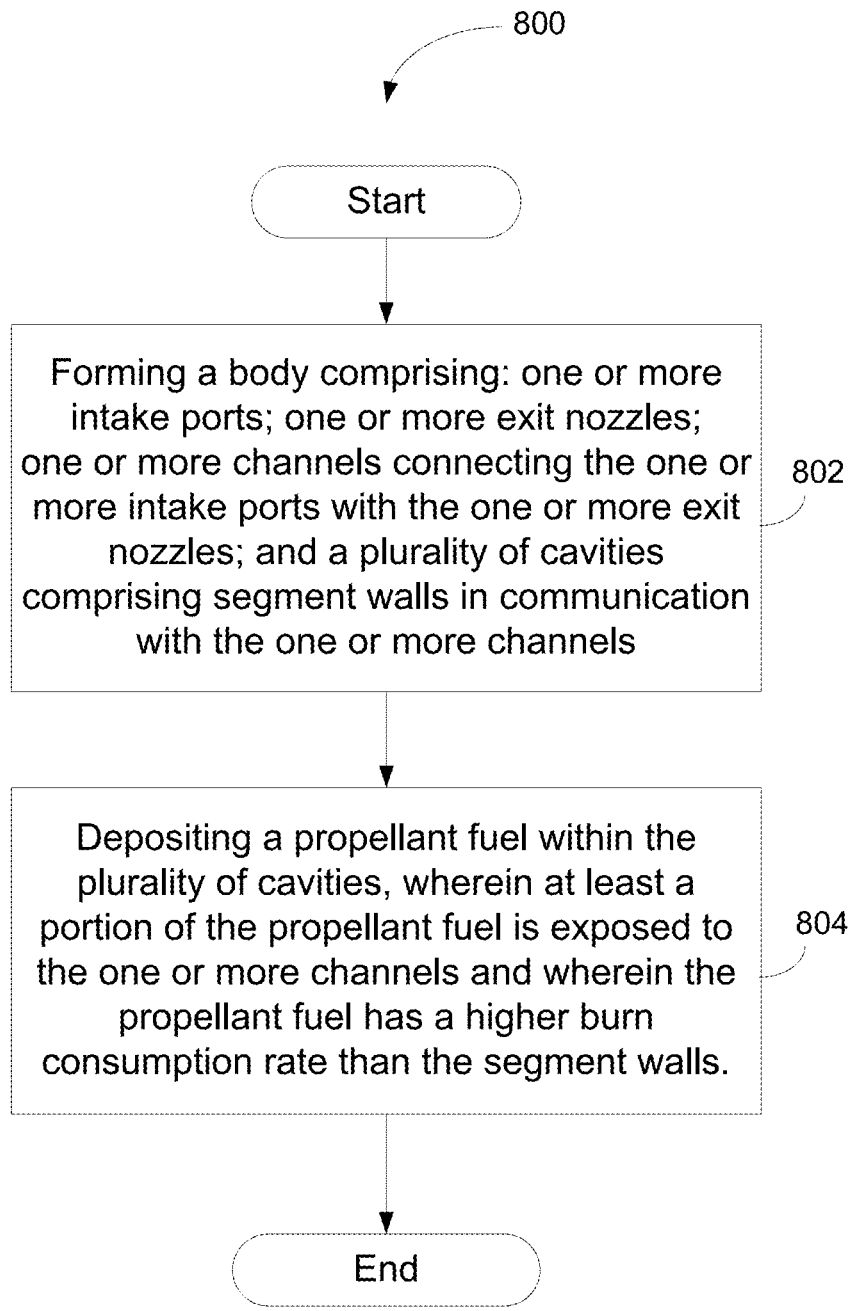
FIG. 8 is a flow diagram of an example method according to an example embodiment of the invention.

An example method 800 for producing a multi-fuel hybrid motor will now be described with reference to the flowdiagram of FIG. 8. The method 800 starts in block 802 and includes forming a body comprising: one or more intake ports; one or more exit nozzles; one or more channels connecting the one or more intake ports with the one or more exit nozzles; and a plurality of cavities comprising segment walls in communication with the one or more channels. In block 804, and according to an example embodiment of the invention, the method 800 includes depositing a propellant fuel within the plurality of cavities, wherein at least a portion of the propellant fuel is exposed to the one or more channels and wherein the propellant fuel has a higher burn consumption rate than the segment walls. The method 800 ends after block 804.

In example embodiments, forming the body 102 and depositing a propellant fuel 108 within the plurality of cavities 116 can include forming a surface area associated with the exposed propellant fuel 108 that is operable to increase as the propellant fuel 108 is consumed. In an example embodiment, forming the body 102 can include forming segment walls 110 that include a solid fuel having a higher melting or deflagration temperature than the propellant fuel 108. In an example embodiment, forming the body 102 can include forming segment walls 110 which may include one or more of thermoplastic, thermoset plastic, acrylic, aluminum, polybutadiene acrylic acid acrylonitrile (PBAN), hydroxy-terminator polybutadiene (HTPB), paper, cloth, phenolic, aramid fibers, polyethylene, polypropylene, ABS plastic, PVC, polycarbonate, polystyrene, acetyl, epoxy, rubber, nylon, carbon fiber cloth, or metal.

In an example embodiment, depositing a propellant fuel 108 within the plurality of cavities 116 can include forming one or more of animal wax, vegetable wax, mineral wax, petroleum wax, synthetic wax, rubber, acrylic, PVC, kerosene, alcohol, vegetable oil, petroleum oil, liquid methane, solid methane, or liquefied natural gas within the plurality of cavities 116. In example embodiments, forming the body 102 and depositing a propellant fuel 108 within the plurality of cavities 116 may be done concurrently using rapid prototyping.

Example embodiments may include a rocket and/or a multi-fuel hybrid motor 100, which may include a body 102. The body 102 may include one or more intake ports 104 and one or more exit nozzles 112. The motor 100 may include one or more channels 114 connecting the one or more intake ports 104 with the one or more exit nozzles 112; a plurality of cavities 116 that may include segment walls 110 in communication with the one or more channels 114; and a propellant fuel 108 disposed within the plurality of cavities 116, wherein at least a portion of the propellant fuel 108 is exposed to the one or more channels 114 and wherein the propellant fuel 108 has a higher burn consumption rate than the segment walls 110. In an example embodiment, surface area associated with the exposed propellant fuel 108 increases as the propellant fuel 108 is consumed. According to example embodiments, the segment walls 110 can include a solid fuel having a higher melting or deflagration temperature than the propellant fuel 108.

In an example embodiment, the segment walls 110 can include one or more of thermoplastic, thermoset plastic, acrylic, aluminum, polybutadiene acrylic acid acrylonitrile (PBAN), hydroxy-terminator polybutadiene (HTPB), paper, cloth, phenolic, aramid fibers, polyethylene, polypropylene, ABS plastic, PVC, polycarbonate, polystyrene, acetyl, epoxy, rubber, nylon, carbon fiber cloth, or metal. In an example embodiment, the propellant fuel 108 can include one or more of animal wax, vegetable wax, mineral wax, petroleum wax, synthetic wax, rubber, acrylic, PVC, kerosene, alcohol, vegetable oil, petroleum oil, liquid methane, solid methane, or liquefied natural gas. In an example embodiment, an oxidizer is input into the intake port 104 and is ignited with an igniter 106 to produce a flame, which in combination with the oxidizer, reacts with at least the propellant fuel 108 to produce thrust in the motor, and wherein the flow of oxidizer is caused to swirl within the motor by the orientation of segment walls 110 exposed to the oxidizer flow. In an example embodiment, the body 102 can include one or more of aluminum, steel, a carbon fiber composite, fiberglass, or aramid fiber.

According to example embodiments, certain technical effects can be provided, such as creating certain systems, methods, and apparatus that provide relatively complex or three-dimensional port shapes within hybrid and/or composite rocket motors. The relatively complex three-dimensional port shapes may assist in increasing the effective length and/or surface area of the associated port shapes to improve fuel/air mixing or to increase turbulence within the channels, increase oxidizer dwell time, improve propellant mass fraction, and minimize associated disruptions in the fuel flow and/or thrust provided in or by the hybrid and/or composite rocket motor fuel grains according to embodiments of the invention. One result of certain embodiments of the invention is increased thrust from fuel grains for hybrid rocket motors.

In example embodiments of the invention, the multi-fuel hybrid motors 100, 500, and assembly 700 may include any number of components to facilitate any of the operations. As desired, embodiments of the invention may include the multi-fuel hybrid motors 100, 500, and assembly 700 with more or less of the components illustrated in FIGS. 1, 5, and 7.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. An apparatus comprising:
   a multi-fuel rocket motor comprising:
   a body comprising:
   an intake port; and
   an exit nozzle;
   a channel connecting the intake port with the exit nozzle;
   a turbulator fin extending into the channel connecting the intake port with the exit port;
   a plurality of cavities comprising one of plastic or rubber segment walls in communication with the channel wherein the segment walls have a first burn consumption rate; and
   a propellant fuel comprising liquefied paraffin disposed within the plurality of cavities, wherein at least a portion of the propellant fuel is exposed to the channel and wherein the propellant fuel has a second burn consumption rate that is higher than the first burn consumption rate of the segment walls.

2. The apparatus of claim 1, wherein a surface area associated with the exposed liquefied paraffin propellant fuel increases as the liquefied paraffin propellant fuel is consumed.

3. The apparatus of claim 1, wherein the segment walls are a solid fuel for the multi-fuel rocket motor and wherein the walls having a higher melting or deflagration temperature than the liquefied paraffin propellant fuel.

4. The apparatus of claim 1, wherein an oxidizer is input into the intake port (104) and is ignited with an igniter to produce a flame, which in combination with the oxidizer, reacts with at least the liquefied paraffin propellant fuel to produce thrust in the motor, and wherein the flow of oxidizer is caused to swirl within the motor by the orientation of at least a portion of the segment walls exposed to the oxidizer flow.

5. The apparatus of claim 1, wherein the body further comprises one or more of aluminum, steel, a carbon fiber composite, fiberglass, or aramid fiber.

6. An apparatus comprising:
   a rocket comprising:
   a multi-fuel rocket motor comprising:
   a body comprising:
   an interior surface and an exterior surface;
   an intake port; and
   an exit nozzle;
   a channel connecting the intake port with the exit nozzle, the channel comprising a longitudinal axis;
   a turbulator fin extending from the interior surface and into the channel connecting the intake port with the exit nozzle, wherein the turbulator fin extends in a helicoidal pattern along the longitudinal axis of the channel;
   at least one cavity, wherein the cavity is defined based at least in part on the turbulator fin and wherein the at least one cavity is in fluid communication with the channel; and
   a propellant fuel disposed within the at least one cavity, wherein at least a portion of the propellant fuel is exposed to the channel and wherein the propellant fuel has a higher burn consumption rate than the turbulator fin.

7. The apparatus of claim 6, wherein a surface area associated with the exposed propellant fuel increases as the propellant fuel is consumed.

8. The apparatus of claim 6, wherein the turbulator fin comprises a solid fuel having a higher melting or deflagration temperature than the propellant fuel.

9. The apparatus of claim 6, wherein the propellant fuel comprises one or more of animal wax, vegetable wax, mineral wax, petroleum wax, synthetic wax, rubber, acrylic, PVC, kerosene, alcohol, vegetable oil, petroleum oil, liquid methane, solid methane, or liquefied natural gas.

10. The apparatus of claim 6, wherein an oxidizer is input into the intake port and is ignited with an igniter to produce a flame, which in combination with the oxidizer, reacts with at least the propellant fuel to produce thrust in the motor, and wherein turbulence is induced into the flow of oxidizer by the turbulator fin within the motor.

11. The apparatus of claim 6, wherein the propellant fuel is liquefied paraffin and wherein the turbulator fin is acrylic.

12. A method for producing a multi-fuel rocket motor, the method comprising:
    forming a motor casing body comprising:
    an interior surface and an exterior surface;
    an intake port; and
    an exit nozzle;
    forming a channel connecting the intake port with the exit nozzle, wherein the channel comprises a longitudinal axis;
    forming a plurality of turbulator fins within the motor casing body, each of the plurality of turbulator fins extending from the interior surface of the motor casing body and into the channel, wherein each of the plurality of turbulator fins extends in a helicoidal pattern along a longitudinal axis of the at least one channel; and
    at least one cavity defined by the plurality of turbulator fins and in fluid communication with the channel; and
    depositing a propellant fuel within the at least one cavity, wherein at least a portion of the propellant fuel is exposed to the channel and wherein the propellant fuel has a higher burn consumption rate than the plurality of turbulator fins.

13. The method of claim 12, wherein forming the body and depositing a propellant fuel (108) within the at least one cavity comprises forming a surface area associated with the exposed propellant fuel that is operable to increase as the propellant fuel is consumed.

14. The method of claim 12, wherein forming the body further comprises forming a plurality of segment walls along the plurality of turbulator fins, the segment walls comprising a solid fuel having a higher melting or deflagration temperature than the propellant fuel.

15. The method of claim 14, wherein the segment walls comprise one or more of thermoplastic, thermoset plastic, acrylic, aluminum, polybutadiene acrylic acid acrylonitrile (PBAN), hydroxy-terminator polybutadiene (HTPB), paper, cloth, phenolic, aramid fibers, polyethylene, polypropylene, ABS plastic, PVC, polycarbonate, polystyrene, acetyl, epoxy, rubber, nylon, carbon fiber cloth, or metal.

16. The method of claim 12, wherein the propellant fuel comprises one or more of animal wax, vegetable wax, mineral wax, petroleum wax, synthetic wax, rubber, acrylic, PVC, kerosene, alcohol, vegetable oil, petroleum oil, liquid methane, solid methane, or liquefied natural gas within the plurality of cavities.

17. The method of claim 12, wherein forming the body and depositing a propellant fuel within the at least one cavity is done concurrently using rapid prototyping.

18. The apparatus of claim 1, wherein the turbulator fin extends in a helicoidal pattern along a longitudinal axis of the at least one channel.

19. The apparatus of claim 1, further comprising a plurality of turbulator fins extending into the channel, each of the plurality of turbulator fins extending in a helicoidal pattern along a longitudinal axis of the channel.

20. The apparatus of claim 6, further comprising a plurality of turbulator fins extending into the channel, each of the plurality of turbulator fins extending in a helicoidal pattern along a longitudinal axis of the channel.

\* \* \* \* \*